(12) United States Patent
Hawrysz

(10) Patent No.: US 8,489,486 B2
(45) Date of Patent: *Jul. 16, 2013

(54) SYSTEM AND METHOD FOR MAKING POSITIONS HELD BY A TRADER FUNGIBLE

(75) Inventor: Joseph E. Hawrysz, Aurora, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 143 days.

This patent is subject to a terminal disclaimer.

(21) Appl. No.: 12/730,595

(22) Filed: Mar. 24, 2010

(65) Prior Publication Data

US 2010/0179925 A1    Jul. 15, 2010

Related U.S. Application Data

(63) Continuation of application No. 11/595,421, filed on Nov. 10, 2006, now Pat. No. 7,716,117.

(51) Int. Cl.
*G06Q 40/00* (2006.01)

(52) U.S. Cl.
USPC .............................. 705/36 R; 705/35; 705/37

(58) Field of Classification Search
USPC .......................................... 705/35, 36 R, 37
See application file for complete search history.

(56) References Cited

U.S. PATENT DOCUMENTS

| | | | |
|---|---|---|---|
| 7,657,477 B1 * | 2/2010 | Chaffee | ............ 705/36 R |
| 7,716,117 B2 | 5/2010 | Hawrysz | |
| 2003/0125982 A1 | 7/2003 | Ginsberg et al. | |
| 2004/0148249 A1 | 7/2004 | Kinnear | |
| 2005/0097025 A1 | 5/2005 | Horton et al. | |
| 2005/0137956 A1 | 6/2005 | Flory et al. | |
| 2005/0154660 A1 | 7/2005 | Sturm et al. | |
| 2005/0234805 A1 | 10/2005 | Robertson et al. | |
| 2006/0059077 A1 | 3/2006 | Goodman et al. | |
| 2006/0080208 A1 | 4/2006 | Harrison | |
| 2006/0224494 A1 | 10/2006 | Pinkava | |
| 2006/0253383 A1 | 11/2006 | Cummings et al. | |
| 2007/0011079 A1 | 1/2007 | May | |

OTHER PUBLICATIONS

Walther, Larry M., "Commodity Futures: What the Accountant Should Know," Journal of Accountancy, Mar. 1982, col. 153, Iss. 3, p. 68.

Lehman Brothers, Annual Report, 2002, p. 86, col. 1. Retrieved from ProQuest as http://proquest.umi.com/pqdweb?did=1139664911&sid=1&Fmt=1&clientId=19649&RQT=309&VName=PQD.

International Search Report and Written Opinion, PCT/US2007/23115 dated Apr. 23, 2008.

"Report on Exchanges of Futures for Physicals," Commodity Futures Trading Commission, Division of Trading and Markets, dated Oct. 1, 1987.

* cited by examiner

*Primary Examiner* — Ojo O Oyebisi
(74) *Attorney, Agent, or Firm* — Lempia Summerfield Katz LLC

(57) ABSTRACT

Positions held by a trader are made fungible by selecting a first position in a first futures contract that is deliverable and selecting a second position in a second futures contract, wherein the first and second futures contracts are traded in a first and second market, respectively. Offsetting the first and the second positions eliminates a delivery obligation of the trader.

28 Claims, 3 Drawing Sheets

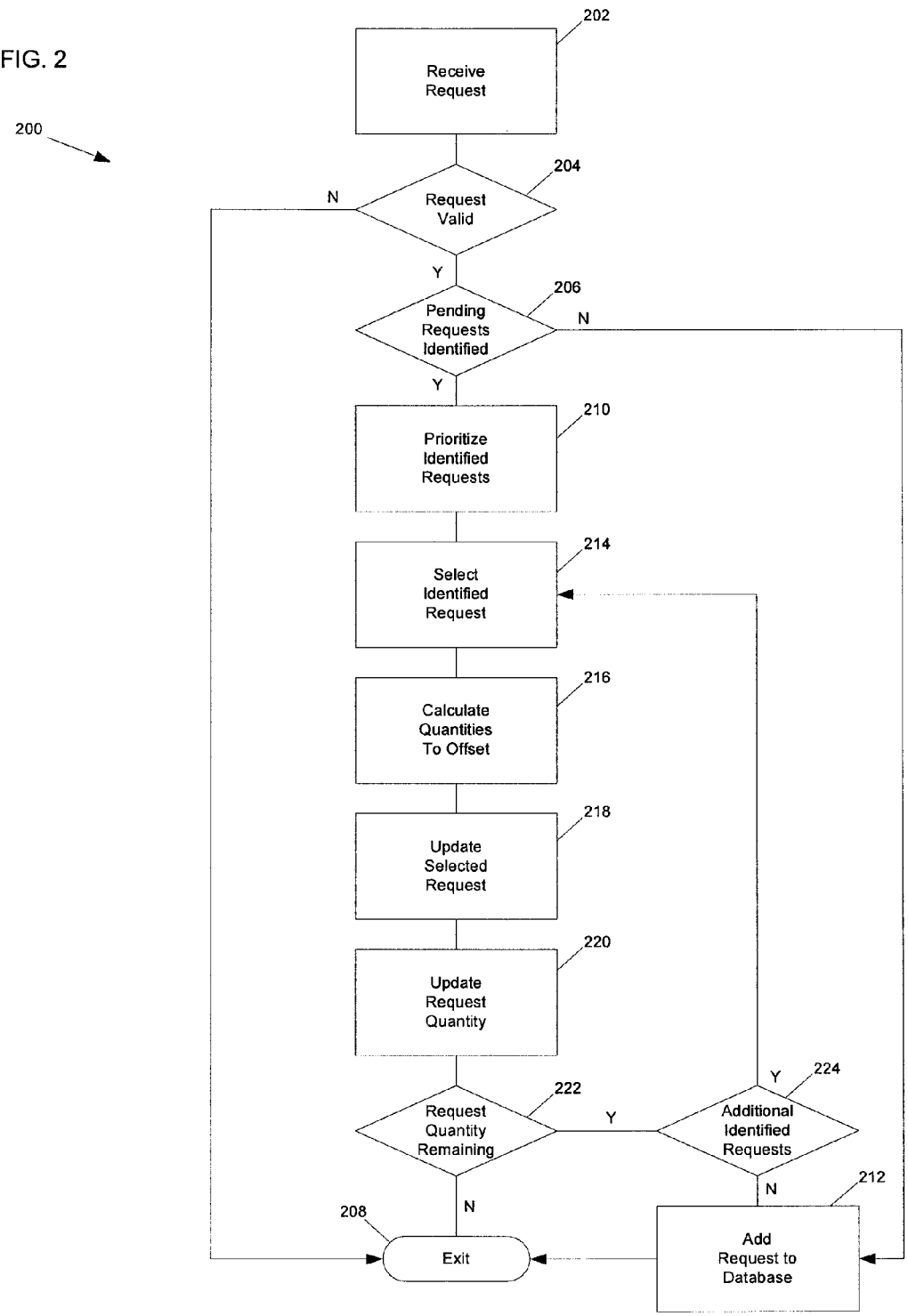

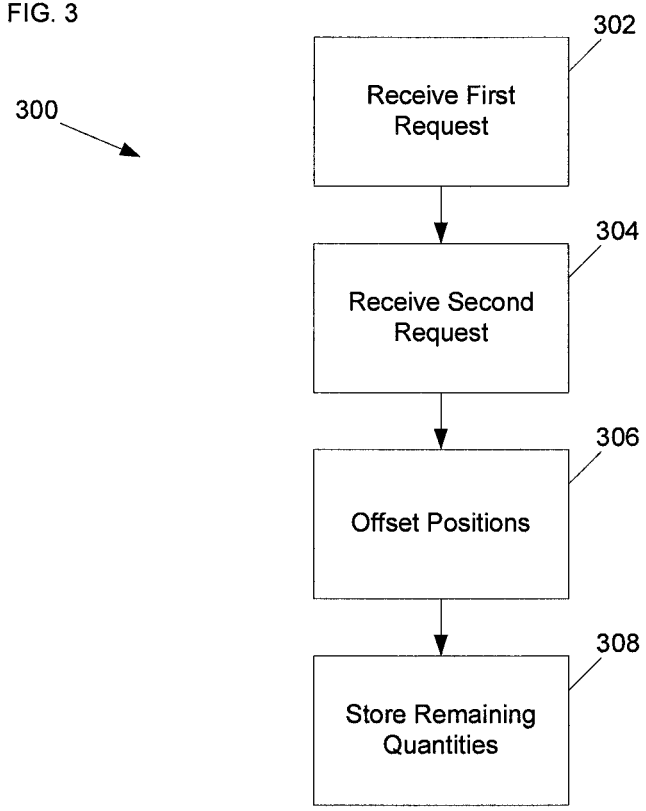

SYSTEM AND METHOD FOR MAKING POSITIONS HELD BY A TRADER FUNGIBLE

CROSS REFERENCE TO RELATED APPLICATIONS

The present application is a continuation of U.S. patent application Ser. No. 11/595,421, the entirety of which is incorporated herein by reference.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present invention relates generally to trade clearing systems and more particularly to a system and method that enables traders to make positions held thereby fungible.

2. Description of the Background of the Invention

Exchanges enable buyers and sellers to trade financial instruments such as stocks, bonds, options, cash, agricultural products and commodities, and futures, etc. A futures contract is a financial instrument that represents an obligation for delivery or acceptance of another, underlying, financial instrument at a specified time in the future. The financial instrument that underlies a futures contract may include a quantity of grains, metals, oils, bonds, or cash. The exchange establishes a futures contract specification that defines the underlying product, a quantity of the underlying product represented by one futures contract, and an expiration date (when the delivery is to begin). The specification defines the expiration date for a futures contract in terms of a month and a year and the futures contract expires on a predetermined day of the defined month and year.

A futures contract may be traded in a physical exchange where buyers and sellers meet. A buyer and a seller use an open outcry auction process among other buyers and sellers to negotiate a price at which to buy and sell, respectively, a quantity of the futures contract. After the buyer and seller agree upon the quantity and the price, the buyer and the seller each report his/her portion of the trade to the exchange. The information reported by the buyer comprises identification information about the buyer, who the buyer believes is the seller, the quantity the buyer believes has been purchased, and the price to be paid thereby. Similarly, the seller reports information comprising identification information thereof, who the seller believes is the buyer, and the quantity the seller believes has been sold and the price to be received thereby. In some cases, the exchange encodes and transmits to a clearinghouse the information reported by the buyer and the seller separately as two sets of trade data. Alternately, the exchange creates and transmits to the clearinghouse matched trade data that comprises the information reported by both the buyer and the seller.

A futures contract may also be traded in an electronic exchange, wherein a trader submits an order to a trading host. The order is either a bid or an offer that indicates a desire to purchase or sell, respectively, the futures contract. The order identifies, at least, the futures contract, the quantity of the futures contract the trader wishes to buy or sell, the price at which the trader wishes to buy or sell the futures contract, and a direction of the order (i.e., whether the order is a bid or an offer). The trading host monitors orders that are received thereby to identify a bid (an offer) for a financial instrument at a particular price with an offer (a bid) for the same financial instrument at the same or lower (higher) price. Upon identification of the bid and the offer, a quantity associated therewith is matched and the quantity, price, and identification information regarding the buyer and seller are transmitted to the clearinghouse as matched trade data.

The exchange has separate markets that are designated to trade certain futures contracts. An open-outcry exchange typically has multiple trading pits with each trading pit, or even a portion thereof, designated for a particular market. Similarly, electronic exchanges have multiple markets where each market trades certain financial instruments and orders associated with each market are managed separately. For example, a futures exchange may have separate markets to trade futures contracts for delivery of 10-Year Treasure Notes in March, 2006, 2-Year Notes in June, 2008, Gold in February 2010, and Oats in March 2007, etc. Furthermore, futures contracts that have identical underlying products but that expire at different times are also traded in separate markets. For example, futures contracts for delivery of 10-Year Treasury Notes in March 2006, and for delivery of 10-Year Treasure Notes in June, 2006, are traded in two different markets The trader who has sold a futures contract is said to have a "short" position and the trader who has purchased a futures contract is said to have a "long" position. A position held by a trader can be offset (eliminated) by obtaining an opposite position in a subsequent trade. For example, a trader who has a short position for a quantity of a futures contract may offset the short position by purchasing an equal quantity of the futures contract. Similarly, a trader who has a long position for a quantity of a futures contract may offset the long position by selling an equal quantity of the futures contract. In these cases, the trader who offsets the position for the quantity of the financial instrument eliminates any delivery or receipt obligation associated with the position.

Futures contracts can offset one another only if they are traded in the same market. Futures contracts that have different contract specifications (e.g., deliverable vs. cash settled, lot sizes, etc.) and thus are traded in different markets cannot offset one another in the manner described above.

The clearinghouse receives trade data regarding trades conducted during a trading session, matches trade data that is transmitted separately, and transmits matched (cleared) trade data to a clearing firm associated with each trader. Each clearing firm marks to market the account of each trader associated therewith. In addition, for each futures contract traded by traders associated with the clearing firm, the clearing firm calculates a sum of the open long positions and a sum of the open short positions in the futures contract held by traders associated with the clearing firm. The clearing firm thereafter reports the sum of the open positions for the futures contract to the clearinghouse. The clearinghouse records the open long and short position for the futures contract reported by each clearing firm. In addition, the clearinghouse calculates the open interest for the futures contract that is the sum of the open long or short positions held all reporting clearing firm. It should be apparent that the sum of the open long positions held by all reporting clearing firms is identical to the sum of the open short positions held by all reporting clearing firms. The clearinghouse reports the open interest for each futures contract to the exchange, which thereafter reports the open interest to traders and other interested parties.

The clearinghouse provides systems that a staff member of a clearing firm, can use to obtain open positions held by the clearing firm. For example, The Chicago Mercantile Exchange Clearing Services provides a system called Front End Clearing system (FEC) that the staff member of the clearing firm can use to obtain the status of trades made by the trader.

Most traders trade futures contracts with the expectation of liquidating their positions before the last trading day and thus eliminating any obligation of having to provide or accept delivery. Such traders expect to offset their positions by trading with other traders such that at expiry, the traders who hold the short and long positions in the contract are those who have sufficient quantity of the underlying product (e.g., Oats) to deliver and those who wish to receive the underlying product, respectively.

Futures contracts that are deliverable call for delivery of a specific grade of a commodity or instrument upon expiration, which is defined by the contract specification of the futures contract. For example, consider a futures contract for delivery of Oats in December, 2006, wherein each contract represents 5,000 bushels of Oats. A trader who holds 5 open short positions in this futures contract must deliver 25,000 bushels of Oats after the last trading day of December, 2006, unless the short positions are liquidated (i.e., offset) before then. Similarly, a trader who, after the last trading day of December, 2006, holds 5 long positions in the same futures contract, must accept 25,000 bushels of Oats if the 5 positions are not liquidated before then. Typically, the delivery or acceptance obligations associated with a futures contract must be fulfilled within a predetermined number business days after expiration of the futures contract and is specified by the specification of the futures contract defined by the exchange. To provide delivery, the trader who holds an open short position in a futures contract delivers warehouse receipts to the trader who holds an open long position for the quantity of underlying product represented by the short position. In some cases, the clearing firm associated with the trader who holds the open short position delivers the warehouse receipts to the clearing firm associated with the trader who holds the open long position.

The trader who holds the short position, but does not have sufficient quantity of the underlying product, must satisfy the deficit by buying a balance of the underlying product on the open cash market. Similarly, the trader who holds the long position but does not have a need for the quantity of the underlying product may sell the excess on the open market, possibly at a loss. In addition, the trader who is long and not in need of the delivery may incur additional expenses related to storage and delivery.

Other futures contracts may be cash settled. These contracts typically trade in an identical fashion to deliverable products and information regarding purchases and sales of such futures contracts are reported to the clearinghouse and clearing firms identically. At the end of each the trading session until expiry, the account of each trader who hold an open short position or an open long position in the cash settled futures contract is credited or debited, respectively, in accordance with the settlement price of the futures contract.

An exchange may have multiple future contract specifications associated with the same underlying product and expiration date. For example, an exchange may have full size futures contract and a mini futures contract, wherein the quantity of the underlying product associated with each mini futures contract is less than the quantity of the underlying product associated with each full size futures contract. For example, the Board of Trade of the City of Chicago defines specifications for a full size and a mini contract for silver, wherein both contracts expire in March, 2007. Each full size futures contract for silver is associated with a delivery of 5,000 ounces and each mini size contract for silver associated with 1,000 ounces of silver. The exchange may allow a trader who has accepted delivery of a full-size contract to convert a receipt for the delivery for an appropriate quantity of receipts for delivery of mini-sized contracts. For example, in the case of the Board of Trade of the City of Chicago a trader who has taken delivery of a receipt redeemable for a full-size (i.e., 5,000 ounce) lot of silver to exchange the receipt for five receipts for mini-sized (i.e., 1,000 ounce) lots of silver. Each of the five receipts for mini-sized lots of silver obtained by the trader in this manner may be used to deliver on a short position held thereby in mini-sized silver contracts.

At the expiry of a futures contract for a particular product, it is possible that a trader who holds a short position in a first futures contract also holds a long position in a second futures contract, wherein the two futures contracts are traded in different markets but the underlying product and the quantity of the underlying product represented by each position are identical. For example, the trader may hold 1 short position in December, 2006, Oats and 5 long positions in December, 2006, mini-Oats (each position represents 5,000 bushels of Oats). If the two futures contracts are cash settled, then at the expiry of the two futures contracts, the clearinghouse adjusts the accounts of the trader in accordance with the contracts. Some clearinghouses allow the trader who holds a long position in one cash settled contract and a short position in another cash settled contract to request that the two positions be made fungible before expiration of either contract, even if the two futures contracts are traded in different markets. In response, the clearinghouse liquidates the positions held by the trader and credits the account of the trader accordingly.

If the clearinghouse is able to make two cash settled products fungible, and thus offset one another, then no deliveries of underlying products are involved. However, making a long position in a first futures contract and a short position in a second futures contract, where either the first or the second futures contract is deliverable fungible in this fashion would result in a situation, after settlement by the clearinghouse, where the sum of open short positions reported by clearing firms would not be identical to the sum of open long positions reported by the clearing firms in the specific markets where the first and second futures contracts are traded. At expiry, a trader would have an open position to either deliver or accept delivery of the underlying product involved, yet no one to receive or deliver the product, respectively.

In another situation, it is possible that the trader holds a position in a deliverable contract and an opposite position in a cash settled futures contract, wherein the quantity of the product underlying both contracts is identical. In this regard, the trader has no price risk for the positions held thereby in that the deliverable contract and the cash settled contract expire to the same settlement price. The cash settled product and deliverable products cannot be settled against one another despite their quantity equivalency because the two types of contracts trade in separate markets and thus are not fungible. In this example when the cash settled futures contract is liquidated on last trading day by means of cash settlement, the position in the deliverable future contract represents a delivery obligation to the trader as described above. Because of this delivery obligation and the risks associated with it, the trader desires to liquidate his position in the cash settled future contract and the deliverable futures contract prior to the last trading day.

SUMMARY OF THE INVENTION

According to one aspect of the invention, a method for making first long and short positions held by a first trader able to be offset against each other includes the step of receiving a first request from the first trader to make a first long position in a futures contract traded in a first market and a first short position to be offset against each other, wherein the first long position has not expired and has a physical delivery associated therewith and wherein the first long position cannot be offset against the first short position. In addition, the method includes the steps of querying a database to select a first entry stored therein, wherein the first entry is associated with a second request received from a second trader to liquidate a second short position for the futures contract traded in the first market, wherein the second short position has not expired and has a physical delivery associated therewith and querying the database to select a second entry stored therein, wherein the second entry is associated with a third request received from a third trader to liquidate a second long position. The method also includes the step of offsetting the first long position against the second short position and the first short position against the second long position, thereby eliminating delivery obligations of the first and second traders and wherein the net of all open long positions in the first market and of all open short positions in the first market after offsetting is unchanged.

In another aspect of the invention, a computer program product for making first long and short positions held by a first trader able to offset against each other is embodied on a computer-readable medium and comprising code that, when executed, causes the computer to receive a first request from the first trader. The first request is to make a first long position in a futures contract traded in a first market and a first short position to be offset against each other, wherein the first long position has not expired and has a physical delivery associated therewith and wherein the first long position cannot be offset against the first short position. The computer program product further causes the computer to select from a database a first entry stored therein, wherein the first entry is associated with a second request received from a second trader to liquidate a second short position for the futures contract traded in the first market, wherein the second short position has not expired and has a physical delivery associated therewith. The computer program product also causes the computer to select from the database a second entry stored therein, wherein the second entry is associated with a third request received from a third trader to liquidate a second long position. In addition, the computer program product causes the computer to offset the first long position against the second short position and the first short position against the second long position, thereby eliminating delivery obligations of the first and second traders and wherein the net of all open long positions in the first market and all open short positions in the first market after offsetting is unchanged.

Other aspects and advantages of the present invention will become apparent upon consideration of the following detailed description.

BRIEF DESCRIPTION OF THE DRAWINGS

FIG. 2 shows a flow chart illustrating how the clearing system of FIG. 1 makes positions fungible;
and
FIG. 3 shows another flow chart illustrating how the clearing system of FIG. 1 makes positions fungible.

DETAILED DESCRIPTION OF THE PREFERRED EMBODIMENTS

Figure 1:
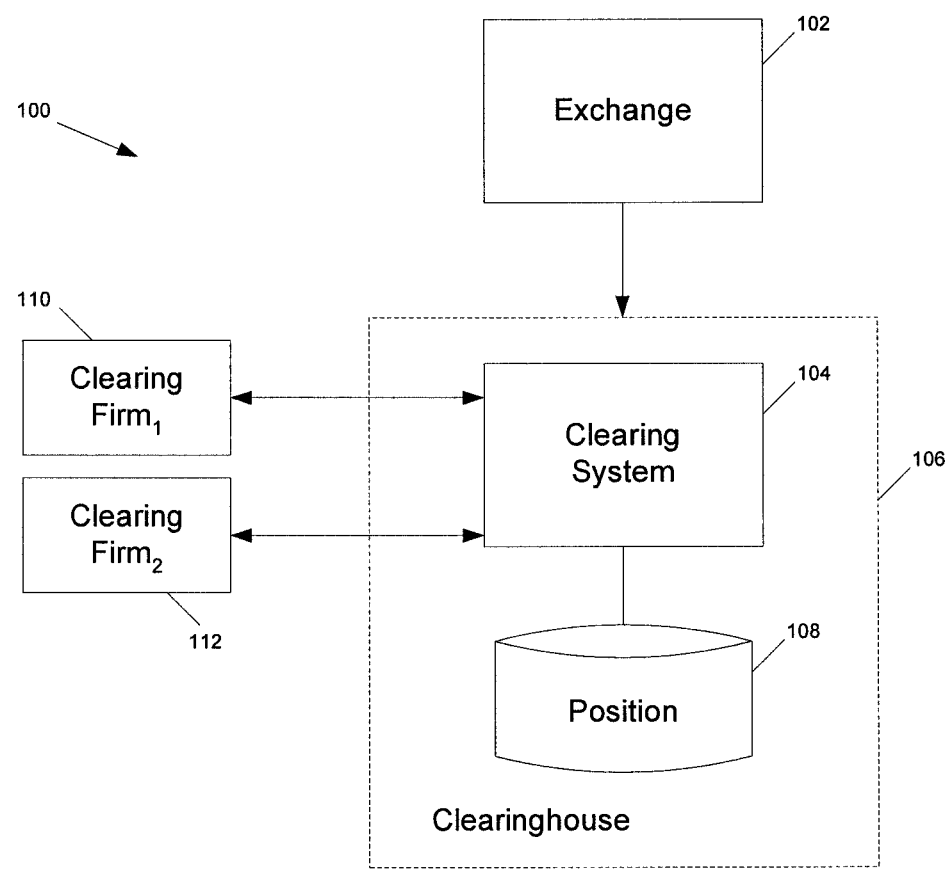
FIG. 1 shows a logical block diagram of a clearing process.

FIG. 1 depicts a logical block diagram 100 of a clearing process. An exchange 102 sends information about each trade executed therein to a clearing system 104 operated by the clearinghouse 106. The trade may have been undertaken in an open outcry auction or matched by a trading host as described above. The trade information may comprise data regarding the purchase or the sale of a futures contract or may comprise matched trade data. Co-pending U.S. patent applications having Ser. Nos. 11/236,995 and 11/237,015, which are incorporated herein by reference, describe generation of matched trade data by an exchange for reporting to a clearinghouse. An example of how trade data is reported to a clearinghouse is provided in co-pending U.S. patent application Ser. No. 10/992,061, which is incorporated herein by reference.

The clearing system 104 validates the trade information and creates a record for the trade information in a position database 108 thereof. After the trade has been reported but before expiration of either a first futures contract or a second futures contract held by a first trader associated with a first clearing firm 110, the first clearing firm 110 can submit a first request that the clearing system 104 attempt to make a short position in the first futures contract and a long position in the second futures contract fungible, where the quantity of the product underlying the first futures contract is identical to that of the second futures contract. In one embodiment, the staff member, at the first clearing firm 110, submits the first request using trade management systems provided by the clearinghouse such as the FEC. In some embodiments, the trade management system displays to the staff member only those contracts that are held by traders associated with the clearing firm and that may be made fungible and the staff member selects the positions that comprise the first request. If the first and the second futures contracts are cash settled, the clearing system adjusts the clearing account of the trader accordingly as described hereinabove. However, if either the first or the second futures contracts is deliverable, then the clearing system 104 compares the first request with other requests previously submitted thereto by clearing firms associated with other traders to identify and select a second request submitted by a second clearing firm 112 associated with a second trader, wherein the second request comprises a long position in the first futures contract and a short position in the second futures contract. In some embodiments, the requests received by the clearing system are stored and processed either periodically or at a predetermined time of day. To process such requests, the clearing system sorts the stored requests in order of time in which each request was received, and selects the oldest request as a first request to be compared against pending requests received earlier. It should be apparent that other methods of sorting may used including by time a request was sent, by quantities associated with the requests, by identity of the requesting trader or clearing firm, etc.

The products underlying the first futures contract and second futures contract need not be identical. In addition, the first and second contracts may have different expiration dates. For example, a trader may wish to make a long position in a futures contract for Soybeans fungible with a short position in a futures contract for Soybean Oil. In another example, the trader may wish to make a long position in a futures contract for Soybeans fungible with a short position in a futures contract for Corn. It should be apparent that the long and short positions comprising the first request may have been acquired in a first and a second exchange respectively. The clearing system 102 offsets such positions against short and long positions of a second request that were acquired in a second and first exchange, respectively.

In one embodiment, the trader may request that the clearing system 104 make a first long position in a first futures contract and a second long position in a second futures contract held thereby fungible. In response, the clearing system 104 offsets the first long position against a first short position in the first futures contract and offsets the second long position in the second futures contract against a second short position in the second futures contract, wherein the first and second short positions are held by another trader.

In some embodiments, if the clearing system 104 does not identify an appropriate second request, the clearing system 104 records information regarding the first request in the position database 108. In other embodiments, the request is recorded in another database associated with the clearing system 104. In one embodiment, the positions data and request information are stored in a relational database such as Oracle 10g™, developed by Oracle Corporation.

If the clearing system 104 does identify a second request, the clearing system 104 settles a first quantity of the long position held by the first trader against an identical quantity of the short position held by the second trader. Typically, the clearing system does not track the identities, positions, or requests on an individual basis. Instead, the clearing system tracks positions and requests made by clearing firms who are an intermediary between the trader and the clearinghouse and also between two traders. In addition, the clearing system 104 settles a second quantity of the short position of the first trader against the long position of the second trader. Preferably, the first quantity is the minimum of the number of long position contracts of the first request and the number of short position contracts of the second request. The clearing system 104 thereafter adjusts trade records in the position database 104 corresponding to the long and short positions of the first clearing firm 110 and second clearing firm 112, respectively, in accordance with the first quantity. The clearing system 104 also adjusts the trade records and corresponding to the short and long positions of the first clearing firm 110 and second clearing firm 112, respectively, in accordance with the second quantity. The clearing system notifies the first clearing firm 110 and the second clearing firm 112 that the requests submitted thereby (or portions thereof) have been satisfied, and the first clearing firm 110 and second clearing firm 112 adjust the accounts of the first and second trader, respectively, accordingly.

In some embodiments, if the clearing system 104 identifies multiple previously submitted requests that have a long position in the first futures contract and a short position in the second futures contract then the clearing system 104 selects the request that was received earliest. In other embodiments, the clearing system 104 allocates the quantities of the long and short positions of the first request in a pro rata fashion amongst the previously received requests.

Because the long quantity of a deliverable futures contract traded in a market is offset against an identical short quantity of the deliverable futures contract in the market, the quantity of remaining open short positions remains identical to the number of remaining open long positions held by traders in the market. Therefore, the remaining open quantities of all other traders may be settled in accordance with contract specifications associated with the market.

Some embodiments of the clearing system 104 compare the open positions of a trader associated with the first clearing firm 110 with requests stored in the positions database 108 to identify one or more combinations of the open positions held by the trader that may be made fungible. The staff member of the clearing firm 110 selects one of the identified combinations and clearing system 104 makes the open positions comprising the combination fungible in the manner described above.

In another embodiment, the clearing system 104 compares the open positions of the trader associated with the clearing firm 110 with requests stored in the position database 108 to identify individual open positions held by the trader, any two of which can be made fungible. Although, the embodiments above describe communications being undertaken between a clearing firm and the clearing system, some embodiments may allow individual traders to submit requests to make positions held thereby fungible without having to go through a clearing firm as an intermediary. It should also be apparent, that the clearing firm may submit requests regarding positions held in house accounts thereof.

FIG. 2 illustrates a flowchart 200 of how the clearing system 104 makes positions held by the trader associated with the clearing firm 110 fungible. A block 202 receives a request from the clearing firm 110 indicating a long position in a first futures contract and a short position in a second futures contract that the trader wishes to make fungible. In some embodiments processing proceeds to a block 204 upon receipt of the request. In other embodiments, the block 202 stores the request for a period of time before proceeding to the block 204. The block 204 validates the request to insure that the information supplied by the clearing firm 110 is correct. Some embodiments validate the request without manual intervention, whereas other embodiments comprise a manual review of the request when validating the request. If the block 204 determines that the request is valid then processing proceeds to a block 206. Otherwise, the clearing firm is notified of errors in the request and processing exits at a block 208. In one embodiment, the block 208 performs cleanup operations (such as releasing allocated memory, closing database connections, etc.) and returns processing to other tasks within the clearing system 104, including a task that waits for additional requests from traders.

The block 206 queries the positions database 108 to identify any previously received requests stored therein that indicates a short position in the first futures contract and a long position in the second futures contract specified by request received by the block 202. If any previously received requests are identified processing proceeds to a block 210; otherwise, a block 212 creates a new record in the positions database 108 and stores information regarding the received request therein and proceeds to the block 208 to exit.

The block 210 assigns a priority to the previously received requests identified by the block 206 in accordance with the allocation method that is to be used to allocate the quantities associated with the long and short positions of the received request among the short and long positions, respectively, of the identified, previously received requests. In some embodiments, the block 210 sorts the previously received requests in accordance with the time of receipt of each request where a request received earlier is assigned a higher priority.

A block 214 selects an identified request that has the highest priority. A block 216 allocates, and thus offsets, a quantity of the long position of the received request to an identical quantity of the short position of the selected request. The block 216 also offsets a quantity of the short position of the received request to an identical quantity of the long position of the selected request. The quantity of the long (short) position of the selected request that is offset depends on the allocation method used. If a first-in/first-out allocation method is used, then the block 216 offsets a quantity of the long (short) position of the received request with a sufficient amount of the short (long) position of the selected request. If a pro-rata method is used, then the block 216 offsets a quantity of the long (short) position of the received request with a proportional amount of the quantity of the short (long) position of the selected request and all of the other identified requests.

The quantity of the short and long positions of the selected request to be offset, as calculated by the block 216, are subtracted from the short and long positions of the selected request by a block 218. If quantities of the short and long positions of the selected request are not zero, then the block 218 updates a record of the position database 108 where the information regarding the selected request is stored to reflect the new quantities. The block 218 also updates the records associated with the account of the trader who submitted the selected request.

A block 220 subtracts from the quantities of the long and short position of the request received at the block 202 the quantities thereof that are offset (as calculated by the block 216). A block 222 determines if any quantities of positions of the request remain and if none remain then processing exits at the block 208. Otherwise, a block 224 determines if there is an additional previously received request identified at the block 206 that has not been processed through the blocks 214-222, and if there is, processing proceeds to the block 214. If all of the identified requests have been processed, then processing proceeds to the block 212, which creates a new record in the position database for the quantities of the long and short positions of the request that remain.

FIG. 3 depicts a flowchart 300 of an embodiment of how two requests from two clearing firms may be made fungible. A block 302 receives a first request from a clearing firm to make a first short position in a first futures contract and a first long position in a second futures contract held thereby fungible. A block 304 receives a second request from either the clearing firm or a second clearing firm to make fungible a second short position in the second futures contract and a second long position fungible in the first futures contract. In some embodiments, the first request may be stored in a database before the second request is received. A block 306 matches the first long position against the second short position and the first short position against the second long positions as described above with reference to blocks 210-220 of FIG. 2. If any quantities of the positions associated with the first request or the second request remain, the positions database is updated accordingly by a block 308.

In some embodiments, the clearing firm submits a request to make two positions fungible may delete the request as long as the request has not been offset by another request. The clearing firm may also modify the quantities of the two positions that are to be made fungible. In some embodiments, if the clearing firm reduces the quantity, the request retains the time of receipt that is used to determine the priority of the request at block 210. However, if the trader increases the quantity of the request, the time of receipt is changed to the time of the modification. In other embodiments, the original request is maintained with the original time of receipt, but an additional request is created with the time of modification that applies to the additional quantity only.

In some embodiments, an entity (e.g., an exchange) may establish an account at the clearinghouse to facilitate tracking and reporting of positions that are made fungible. When the clearing system offsets a portion of the long and short positions of a first request against the short and long positions, respectively, of a second request, a long position identical to portion of the long position first request is posted into the account of the entity and a short position identical to the second request is posted as a short position into the account of the entity. The two positions are matched and cleared, and the match is reported to the entity. The entity can report the match to other traders and other interested parties without identifying the first and second clearing firms. Similarly, positions that are identical to portion of the short position of the first request that is offset and the long position of the second request may be posted to the account of the entity for reporting and tracking purposes.

The Exchange or clearinghouse may specify a number of days before expiration by which requests to make positions fungible must be received. For example, requests may have to be submitted at least three days before expiration of a futures contract. In addition, the exchange or clearinghouse may not allow traders to modify requests within a predetermined number of days before expiration of the futures contract.

In some embodiments, the clearing system may identify and combine, in the manner described above, positions held by multiple traders to offset positions held by one trader, whereby the open long and open short positions for each of the products associated with the positions of any of the traders remain in balance (i.e., are identical). For example, suppose a trader A holds a long position in March, 2007, soybeans and a short position in March, 2007, soybean oil; a trader B holds a long position in March, 2007, soybean oil and a short position in September, 2007, gold; and a trader C holds a long position in September, 2007, gold and a short position in March, 2007, soybeans. The clearing system offsets the long position of trader A against the short position of trader C (soybeans), the short position of trader A against the long position of trader B (soybean oil), and the long position of trader C against the short position of trader B (gold). In this manner, any delivery obligations of traders A, B, and C associated with the positions held thereby are liquidated and the open long and open short positions in March, 2007, soybeans, March, 2007, soybean oil, or September, 2007, gold remain in balance.

It should be apparent that products in which two positions held by a trader are made fungible is not limited to positions acquired through transactions managed by an exchange. Some products are traded in an over the counter (OTC) market where traders negotiate prices, quantities, and delivery dates. OTC transactions obligate a seller to deliver to a buyer by a specific date a quantity of a product for a particular price. Conversely, the buyer in the transaction has an obligation to accept delivery of the product and pay the seller. A trader may report an agreement made thereby in the OTC market to a clearing firm associated with the trader, and the clearing firm may report the agreement to the clearing firm. Thereafter, the trader may request, via the clearing firm, that the clearinghouse make fungible the obligation associated with a transaction undertaken in the OTC market and another position held by the trader (either from an exchange or an OTC market transaction). The clearing system settles the positions of the trader specified in the request against appropriate positions of another trader in a manner identical to that described above.

It should be apparent that although the manner of making positions fungible describes the use of a system at the clearinghouse, the clearinghouse is an intermediary and that other intermediaries may be used. Furthermore, it should be apparent that the system and method described above can be used to make liquidate an obligation to deliver, or accept delivery of, any type of product, including financial products (securities or debt instruments), metals, agricultural products, stock index products, or livestock.

INDUSTRIAL APPLICABILITY

Numerous modifications to the present invention will be apparent to those skilled in the art in view of the foregoing description. Accordingly, this description is to be construed as illustrative only and is presented for the purpose of enabling those skilled in the art to make and use the invention and to teach the best mode of carrying out same. The exclusive rights to all modifications which come within the scope of the appended claims are reserved.

I claim:

1. A method for making first long and short positions held by a first trader able to be offset against each other, the method comprising the steps of:
receiving a first request from the first trader to make a first long position in a first futures contract traded in a first market and a first short position in a second futures contract traded in a second market different from the first market to be offset against each other, wherein the first long position has not expired and has a physical delivery associated therewith and wherein the first long position cannot be offset against the first short position because they are traded in different markets;
querying a database to select a first entry stored therein, wherein the first entry is associated with a second request received from a second trader to liquidate a second short position for the first futures contract traded in the first market, wherein the second short position has not expired and has a physical delivery associated therewith;
querying the database to select a second entry stored therein, wherein the second entry is associated with a third request received from a third trader to liquidate a second long position for the second futures contract traded in the second market;
offsetting the first long position against the second short position and the first short position against the second long position, thereby eliminating delivery obligations of the first and second traders and wherein the net of all open long positions in the first market and of all open short positions in the first market after offsetting is unchanged.

2. The method of claim 1, wherein the first short position and the second long position are for products traded in a second market and the sum of all open long positions in the second market is identical to the sum of all open short positions in the second market after offsetting.

3. The method of claim 1, wherein the second request is to make the second long position offset against a third short position held by the second trader.

4. The method of claim 2, wherein the third request is to make the second short position offset against a third long position held by the third trader and wherein offset step comprises the further step of offsetting the third long position against the third short position.

5. The method of claim 1, wherein the first entry has a priority associated therewith.

6. The method of claim 5, wherein the priority is associated with a time when the second request was received.

7. The method of claim 5, wherein the step of querying the database to select the first entry comprises the step of querying the database to select the first entry in accordance with the priority associated therewith.

8. The method of claim 1, wherein the products underlying the first long position and the first short position are identical.

9. The method of claim 1, wherein the first short position has a physical delivery associated therewith.

10. The method of claim 9, wherein the step of offsetting comprises the step of eliminating the physical delivery obligation associated with the first short position.

11. The method of claim 1, wherein the step of offsetting comprises the step of eliminating a portion of the first long position.

12. A computer program product for making first long and short positions held by a first trader able to be offset against each other, the computer program product embodied on a computer-readable medium and comprising code that, when executed, causes the computer to perform the following:
receive a first request from the first trader to make a first long position in a first futures contract traded in a first market and a first short position for a second futures contract traded in a second market different from the first market to be offset against each other, wherein the first long position has not expired and has a physical delivery associated therewith and wherein the first long position cannot be offset against the first short position because they are traded in different markets;
select from a database a first entry stored therein, wherein the first entry is associated with a second request received from a second trader to liquidate a second short position for the first futures contract traded in the first market, wherein the second short position has not expired and has a physical delivery associated therewith;
select from the database a second entry stored therein, wherein the second entry is associated with a third request received from a third trader to liquidate a second long position for the second futures contract traded in the second market;
offset the first long position against the second short position and the first short position against the second long position, thereby eliminating delivery obligations of the first and second traders and wherein the net of all open long positions in the first market and all open short positions in the first market after offsetting is unchanged.

13. The computer program product of claim 12, wherein the first short position and the second long position are for products traded in a second market and the sum of all open long positions in the second market is identical to the sum of all open short positions in the second market after offsetting.

14. The computer program product of claim 12, wherein the second request is to make the second long position offset against a third short position held by the second trader.

15. The computer program product of claim 13, wherein the third request is to make the second short position offset against a third long position held by the third trader and wherein causing the computer to offset further causes the computer to offset the third long position against the third short position.

16. The computer program product of claim 12, wherein the first entry has a priority associated therewith.

17. The computer program product of claim 16, wherein the priority is associated with a time when the second request was received.

18. The computer program product of claim 16, wherein causing the computer to select from the database the first entry causes the computer to select from the database the first entry in accordance with the priority associated therewith.

19. The computer program product of claim 12, wherein the products underlying the first long position and the first short position are identical.

20. The computer program product of claim 12, wherein the first short position has a physical delivery associated therewith.

21. The computer program product of claim 20, wherein causing the computer to offset causes the computer to eliminate the physical delivery obligation associated with the first short position.

22. The computer program product of claim 12, wherein causing the computer to offset causes the computer to eliminate a portion of the first long position.

23. The method of claim 1 wherein the first market is characterized by a first contract specification and the second market is characterized by a second contract specification different from the first contract specification.

24. The method of claim 23 wherein the first contract specification comprises a first delivery method and the second contract specification comprises a second delivery method different from the first delivery method.

25. The method of claim 23 wherein the first contract specification comprises a first lot size method and the second contract specification comprises a second lot size different from the first lot size.

26. The computer program product of claim 12 wherein the first market is characterized by a first contract specification and the second market is characterized by a second contract specification different from the first contract specification.

27. The computer program product of claim 26 wherein the first contract specification comprises a first delivery method and the second contract specification comprises a second delivery method different from the first delivery method.

28. The computer program product of claim 26 wherein the first contract specification comprises a first lot size method and the second contract specification comprises a second lot size different from the first lot size.

* * * * *